(12) United States Patent
Sandmeier

(10) Patent No.: US 8,062,462 B2
(45) Date of Patent: Nov. 22, 2011

(54) SYSTEM AND METHOD FOR JOINING NON-TRANSPARENT PARTS BY MEANS OF A RADIATION CURABLE ADHESIVE

(75) Inventor: Bruno Sandmeier, Seengen (CH)

(73) Assignee: Erowa AG (CH)

( * ) Notice: Subject to any disclaimer, the term of this patent is extended or adjusted under 35 U.S.C. 154(b) by 944 days.

(21) Appl. No.: 12/009,691

(22) Filed: Jan. 22, 2008

(65) Prior Publication Data
US 2008/0173394 A1    Jul. 24, 2008

(30) Foreign Application Priority Data

Jan. 22, 2007    (CH) ........................................ 0088/07

(51) Int. Cl.
B29C 35/08    (2006.01)
(52) U.S. Cl. .................. 156/275.5; 156/379.6
(58) Field of Classification Search .............. 156/272.2, 156/273.3, 273.5, 275.5, 275.7, 293, 297, 156/298, 299, 300, 306.6, 307.7, 379.6, 379.8, 156/380.9, 423
See application file for complete search history.

(56) References Cited

U.S. PATENT DOCUMENTS

| 6,627,015 B1 * | 9/2003 | Takemoto et al. .............. 156/64 |
| 2001/0036149 A1 * | 11/2001 | Berg et al. ...................... 369/290 |
| 2001/0046644 A1 * | 11/2001 | Ukachi et al. .............. 430/281.1 |
| 2002/0066528 A1 * | 6/2002 | Oxman et al. ............. 156/275.5 |
| 2005/0136210 A1 * | 6/2005 | Boettcher ........................ 428/76 |

FOREIGN PATENT DOCUMENTS

| JP | 05210046 A * | 8/1993 |
| WO | WO 9958355 A1 * | 11/1999 |

OTHER PUBLICATIONS

Machine Translation of JP 05210046 A (Aug. 20, 1993).*

* cited by examiner

*Primary Examiner* — Richard Crispino
*Assistant Examiner* — Daniel McNally
(74) *Attorney, Agent, or Firm* — Maginot, Moore & Beck, LLP

(57) ABSTRACT

A system and a method for joining non-transparent parts (1, 2) by means of an electromagnetic radiation curable adhesive comprises at least one at least partly transparent element (3) inserted between the parts (1, 2) to be joined together such that electromagnetic radiation beamed into the element (3) initiates curing of a film of adhesive applied to the element (3) and/or to a non-transparent part (1, 2).

18 Claims, 3 Drawing Sheets

SYSTEM AND METHOD FOR JOINING NON-TRANSPARENT PARTS BY MEANS OF A RADIATION CURABLE ADHESIVE

BACKGROUND

The invention relates to a system and method for joining non-transparent parts by means of a radiation curable adhesive.

When parts are to be joined by means of a face coating of an electromagnetic radiation curable adhesive, at least one of the two parts needs to be transparent for the radiation initiating curing so that the adhesive can be activated and cured by the radiation.

Known from DE 10 2005 002 076 A1 is a method for producing a metal-framed glass pane component in which a pane of glass is cemented to a frame element by means of a UV curable adhesive. Disposed between the glass pane and the frame element is a bevelled gap which is filled with the adhesive utilizing the capillary effect. Once the gap is filled the adhesive is cured by means of UV irradiation.

SUMMARY

The invention has one object of proposing a system and method for joining non-transparent parts by means of an electromagnetic radiation curable adhesive achieving fast curing of the adhesive by irradiation even when the adhesive is face coated between the non-transparent parts.

One gist of the invention is that an at least partly transparent element is inserted between the non-transparent parts to be joined together, by means of which the radiation initiating curing of the adhesive can now be introduced into a layer of the adhesive face coated between the non-transparent parts so that fast curing is now possible when needed. The at least partly transparent element in this arrangement may be configured both as a joining part by it being inserted as a kind of connector between the parts to be joined together and cemented on both sides with each part. In this case such an element must be able to receive the forces to be communicated to the other part. As an alternative, the at least partly transparent element may be configured simply as a kind of radiation distributor which directs the radiation initiating curing of the adhesive to the wanted locations. This system is particularly suitably for fast and durable joining non-transparent parts by means of the cited adhesive once they have been accurately positioned.

DESCRIPTION OF THE FIGURES

An example embodiment of the invention will now be detailed with reference to the attached drawings in which.

DESCRIPTION OF THE EMBODIMENTS

Figure 1:
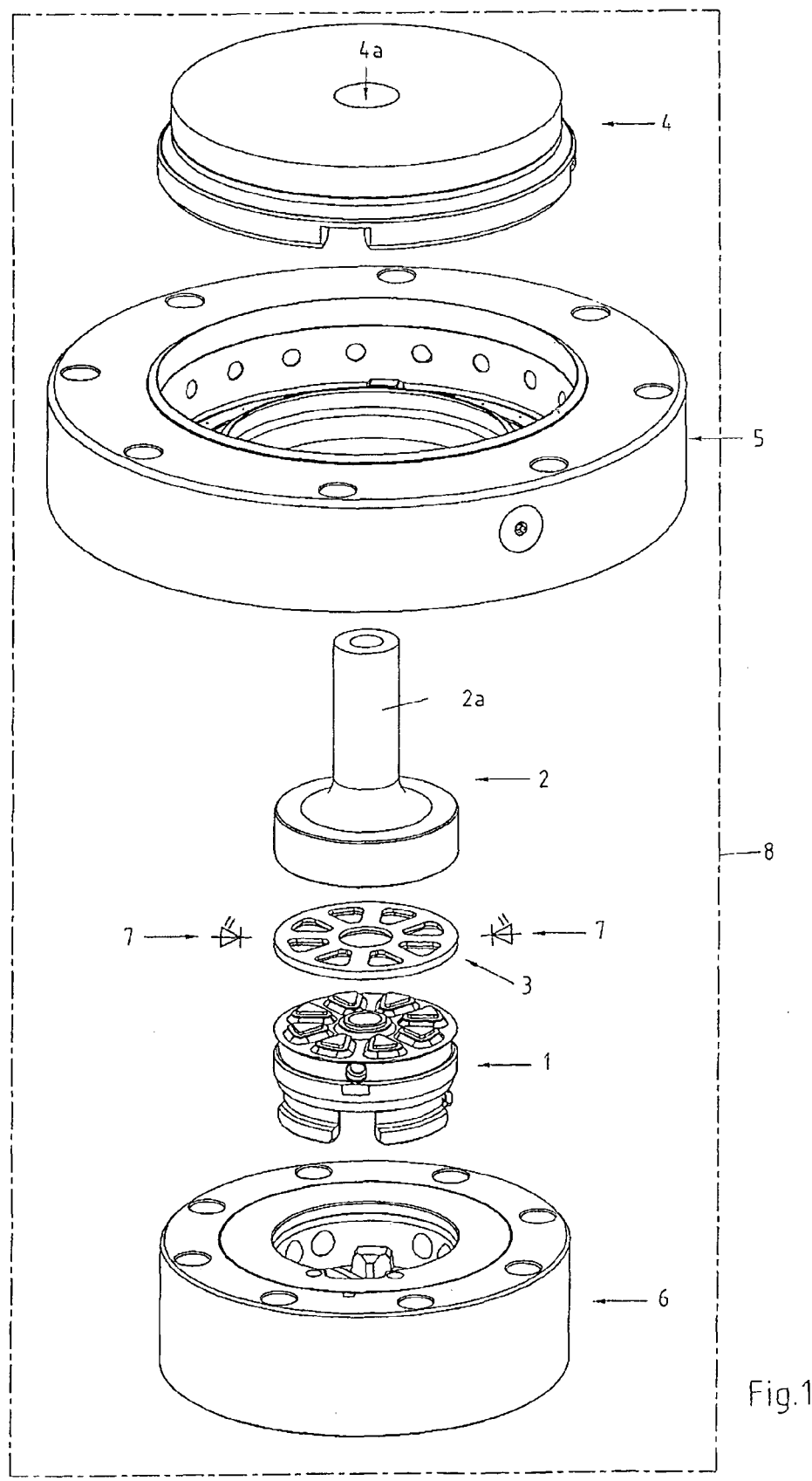
FIG. 1 is an exploded view of the components forming the system for joining two non-transparent parts.

Referring now to FIG. 1 there are illustrated some of the components of the system for joining two non-transparent parts together. In the present example the parts to be joined together consist of a pallet 1 and a ram 2 made of metal and thus non-transparent to visible or UV light. A salient component of the system is a transparent element 3 in the form of a round disk. This element 3 comprises two piano-parallel surfaces and is inserted as a joining element between the two parts to be joined together. Further components of the system are a centering element 4 for centering the ram 2 relative to the pallet 1, as well as an irradiation source 7 which emits light in a wavelength range adapted to an adhesive for photo-initiated curing, for example UV light. The irradiation source 7 depicted in this case simply diagrammatically by two LEDs serves to initiate curing of a coated film of adhesive to cement the parts at the locations intended. The irradiation source 7 is preferably configured such that the emitted electromagnetic radiation is beamed distributed to several locations in the element 3. For example, the irradiation source 7 may comprise a plurality of LEDs preferably arranged in a circle so that the radiation is beamed into the element 3 optimally evenly. The adhesive used is preferably a photo-initiated curing acrylate cement which attains its final strength in just a few seconds by irradiation with UV or visible light.

Also evident is an upper and a lower chuck 5, 6. The upper chuck 5 serves to locate accurately positioned the centering element 4 configured as an anvil whilst the lower chuck 6 serves to locate accurately positioned the pallet 1. Preferably both chucks 5, 6 are secured to a frame or, for example, in a press so that at least the one chuck 5 is axially movable relative to the other chuck 6. In the present example it is the upper chuck 5 that is arranged axially movable relative to the lower chuck 6, the means for this purpose not being shown. All that is indicated diagrammatically is the frame 8 serving to support both chucks 5, 6.

Figure 2:
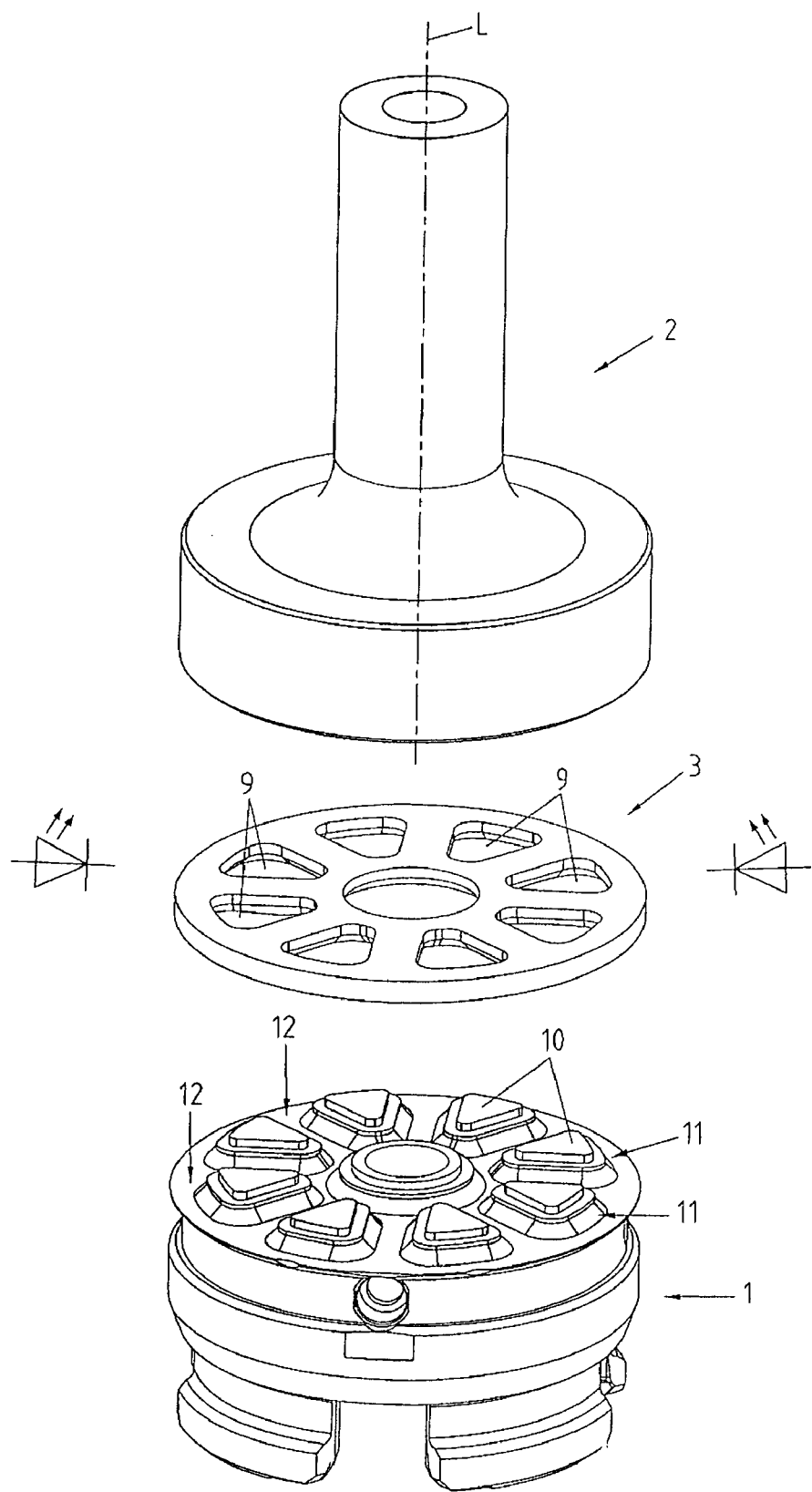
FIG. 2 is a magnified view of some of the components of the system.

Referring now to FIG. 2 there are illustrated the pallet 1, the ram 2 and the transparent element 3 on a magnified scale, showing how the transparent element 3 is provided with a plurality of through-holes 9 for receiving protuberances 10 applied to the pallet 1. The protuberances 10 feature a flat top surface forming together a surface for mounting the ram 2. But in any case the protuberances 10 are configured somewhat higher than the transparent element 3 so that they protrude from the transparent element 3 when it is cemented to the pallet 1. To secure the ram 2 to the pallet 1 a film of adhesive is applied between the pallet 1 and the transparent element 3 and between the ram 2 and the transparent element 3 each as is detailed further on. The final thickness of this film of adhesive is determined by the difference between the height of the protuberances 10 and the height or thickness of the transparent element 3. To achieve an optimum thickness of the adhesive film the protuberances 10 are higher than the transparent element 3 by roughly twice the thickness of the film of adhesive in each case. Preferably the protuberances 10 are approximately 0.1 to 0.5 mm higher than the transparent element 3 so that between the pallet 1 and the flat bottom side of the transparent element 3 and between the ram 2 and the flat top side of the transparent element 3 a film of adhesive in the thickness range of 0.05 to 0.25 mm is applied or can remain in each case.

It is furthermore evident that the foot of each protuberance 10 features slanted surfaces 11. These surfaces 11 serves in the present case to deflect part of the light introduced sideways into the transparent element 3 upwards so that the film of adhesive applied between the top side of the transparent element 3 and the bottom side of the ram 2 cures fast when necessary. Instead of, or in addition to, these surfaces 11 the transparent element 3 itself may be configured such that at least part of the UV light beamed thereinto sideways is deflected or dispersed. This may be done either by suitably selecting the material or inclusions may be provided in the material which cause the light to be deflected or dispersed.

The material eligible for this is, for example, polycarbonate (PC), especially MAKROLON® or polymethylmethacrylate (PMMA).

To secure the ram 2 to the pallet 1, preferably the transparent element 3 is first joined to the pallet 1. For this purpose a film of adhesive is applied to the pallet 1, the adhesive preferably being applied only to the flat surfaces 11 of the pallet 1 and/or the bottom side of the transparent element 3 but not to the protuberances 10. Then, the transparent element 3 is located on the pallet 1 such that the protuberances 10 extend into the through-holes 9 of the transparent element 3, after which the adhesive is cured by exposing the film of adhesive via the transparent element 3 to the light initiating curing. If the ram 2 is still to be located on the pallet 1 the light can be beamed into the transparent element 3 top down facewise.

Positioning the transparent element 3 on the pallet 1 can be done anywhere, but in any case without the pallet 1 needing to be clamped in the chuck. Prior to positioning the ram 2 on the transparent element 3 the pallet 1 is positioned on the chuck 6 (FIG. 1), however, after which adhesive is applied to the flat top side of the transparent element 3 and/or the bottom side of the ram 2 and the ram 2 placed on the transparent element 3. Because the protuberances 10 protrude slightly beyond the top side of the transparent element 3, the bottom side of the ram 2 comes to rest only on the protuberances 10, but not on the transparent element 3, the ram 2 thereby being precisely positioned relative to the pallet 1 in the Z direction, i.e., in the direction of the longitudinal centerline L. Before curing the adhesive the ram 2 is also aligned accurately positioned in the X and Y direction relative to the pallet 1. For this purpose the centering element 4 is travelled down so that the cylindrically shaped front part 2a of the ram 2 enters into the central anvil opening 4a (FIG. 1) in thereby orienting the ram 2 in the X and Y direction. The adhesive is then cured by beaming the radiation initiating curing sideways into the transparent element 3.

Figure 3:
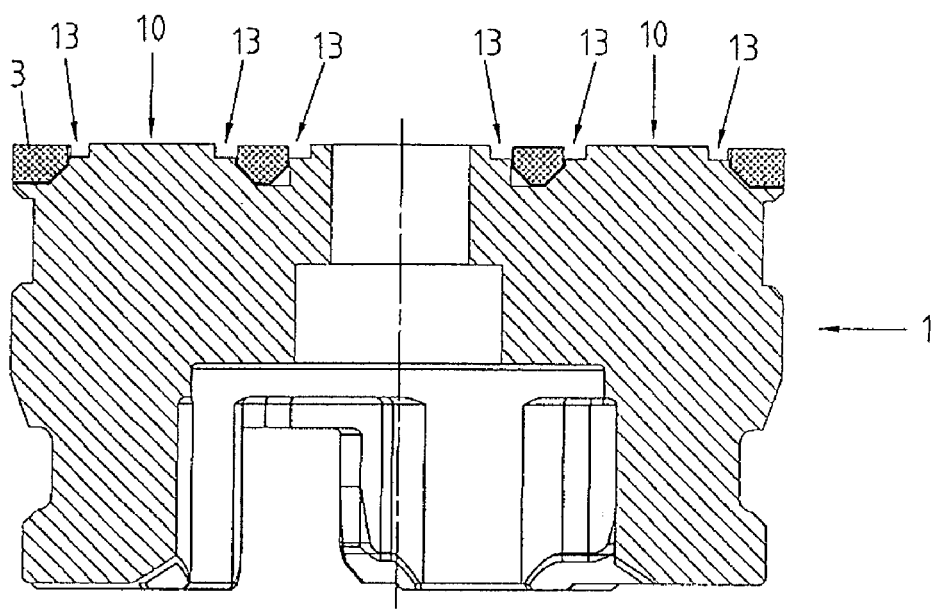
FIG. 3 is a longitudinal section through two components of the system.

Referring now to FIG. 3 there is illustrated a longitudinal section through the pallet 1 and the transparent element 3 cemented thereto. What is particularly evident from this figure is how groove-shaped recesses 13 are formed between the protuberances 10 of the pallet 1 and the through-holes 9 in the transparent element 3, each of which surrounds the corresponding through-holes 9 in serving to receive excess adhesive. Such recesses 13 may also be provided, where necessary, on the bottom side of the transparent element 3.

Providing a transparent element 3 in this way has the advantage that non-transparent parts can now be joined to each other face coated by means of an adhesive cured by radiation which in being beamed into the transparent element needs to be deflected or dispersed at least partly in the direction of the applied adhesive.

But in any case, the radiation achieving or initiating curing can be directed by means of the transparent element to locations which otherwise would not be accessible to the light.

Instead of proceeding stepwise as described above in which first the transparent element 3 is cemented to the pallet 1 and then the ram 2 to the transparent element 3, the pallet 1 as well as the ram 2 could also be cemented simultaneously to the transparent element 3. For this purpose the cited three parts—pallet 1, transparent element 3 and ram 2—would need to be joined together in application of the corresponding films of adhesive and the ram 2 aligned relative to the pallet 1, after which the two films of adhesive, namely the film between pallet 1 and transparent element 3 and the film between the transparent element 3 and ram 2 are cured simultaneously by beaming the light initiating curing into the transparent element 3. In this case all that would need to be assured is that the light beamed sideways into the transparent element 3 is deflected or dispersed to both sides, i.e. in the direction of the pallet 1 as well as in the direction of the ram 2.

In speaking of the element being transparent it is to be appreciated that each element is at least partly transparent to the light initiating curing of the adhesive so that the radiation beamed into the transparent element can be supplied via this element to the corresponding film of adhesive, whereas non-transparent parts in this case are to be appreciated as not being so transparent to the radiation initiating curing of the adhesive that the light can be introduced into the coated film of adhesive facewise. In no case is this to be appreciated only as parts absolutely non-transparent to light.

Several possibilities exist for deflecting the radiation beamed into the transparent element 3 sideways in the direction of the applied adhesive. One way to achieve this is by a suitable selection of material of the transparent element. Another way is to provide deflecting surfaces as described above on at least one of the two parts to be joined together.

Unlike conventional systems in which the ram 2 is secured to the pallet 1 mechanically, the system in accordance with the invention has the salient advantage that locating the ram 2 on the pallet 1 is now very fast and very precise. Contrary to mechanical positioning, cementing now makes it possible to secure the ram 2 practically with no force so that it can now be secured to the pallet 1 fast and with high absolute accuracy. Palletizing the ram 2 in this way now makes it possible to replace it simply and quickly where necessary and located accurately positioned in a press.

What is claimed is:

1. A system for joining non-transparent parts by means of an electromagnetic radiation curable adhesive, comprising:
   a first non-transparent part (1);
   a second non-transparent part (2);
   a radiation curable adhesive disposed between said first and second parts; and
   at least one at least partly transparent element (3) disposed between said first and second non-transparent parts, said element (3) configured such that electromagnetic radiation beamed into said element (3) initiates curing of said adhesive,
   wherein said element (3) is substantially planar with opposite surfaces facing said first and second parts, and is configured and arranged between said first and second parts to only receive electromagnetic radiation beamed sideways into said element relative to said opposite surfaces,
   wherein said opposite surfaces are plano-parallel surfaces and said adhesive is applied between said opposite surfaces and corresponding non-transparent parts (1, 2).

2. The system as set forth in claim 1, characterized in that;
   at least one of the parts (1) includes a number of protuberances (10); and
   said at least partly transparent element (3) is provided with a like number of through-holes (9) arranged to receive the protuberances (10) extending therethrough when the parts (1, 2) are joined together.

3. The system as set forth in claim 2, characterized in that the protuberances (10) have a height greater than the thickness of said at least partly transparent element (3) at said through-holes (9), whereby the protuberances serve as a mount for the other non-transparent part (2).

4. The system as set forth in claim 2, characterized in that the protuberances (10) include surfaces (11) configured to direct at least part of the radiation beamed into said at least partly transparent element (3) in the direction of adhesive disposed between the element and a non-transparent part (1, 2).

5. The system as set forth claim 1, characterized in that the at least partly transparent element (3) is made of a glass or plastics material.

6. The system as set forth in claim 5, characterized in that the at least partly transparent element (3) is made of polycarbonate or polymethylmethacrylate.

7. The system as set forth in claim 1, characterized in that the at least partly transparent element (3) is disk-shaped.

8. The system as set forth in claim 1, characterized in that the at least partly transparent element (3) is provided with a plurality of openings (9) extending between said opposite surfaces.

9. The system as set forth in claim 1, characterized in that said at least partly transparent element (3) and/or a non-transparent part (1, 2) is provided with recesses (13) defined in a surface thereof for receiving excess adhesive.

10. The system as set forth in claim 1, characterized in that the system further comprises an irradiation source (7) which includes a plurality of LEDs arranged to beam into different locations on said at least partly transparent element (3).

11. The system as set forth in claim 1, characterized in that the system further comprises means (4, 4a) for aligning one non-transparent part (2) relative to the other non-transparent part (1).

12. The system as set forth in claim 1, characterized in that:
one of the non-transparent parts is a pallet (1) including a chuck (6) configured to be engaged by a press; and
the other of said non-transparent parts is a tool (2).

13. The system of claim 1, wherein the adhesive is applied in a film only on the non-transparent parts.

14. A method for joining non-transparent parts (1, 2) by means of an electromagnetic radiation curable adhesive, comprising the steps of:
inserting an at least partly transparent element (3) between the two parts (1, 2) to be joined together, the element including opposite substantially planar surfaces facing the two parts;
applying a film of adhesive only between the element and each of the two parts; and
curing the film of adhesive to join the parts (1, 2) with only the electromagnetic radiation that is beamed sideways relative to the opposite surfaces into the at least partly transparent element (3).

15. The method as set forth in claims 14, further comprising the step of accurately aligning the non-transparent parts (1, 2) to be joined together before beaming the electromagnetic radiation.

16. The method as set forth in claim 14, further comprising the steps of:
applying a first film of adhesive between the least partly transparent element (3) and the first non-transparent part (1);
applying a second film of adhesive between the at least partly transparent element (3) and the second non-transparent part (2);
accurately aligning the two parts (1, 2) to be joined together; and
then beaming electromagnetic radiation to at least the one of the two films of adhesive via the at least partly transparent element (3).

17. The method as set forth in claim 14, wherein the curing step includes beaming radiation into the element (3) from a plurality of irradiation sources.

18. The method of claim 14, wherein the step of applying a film of adhesive includes applying a film only on the non-transparent parts.

* * * * *